United States Patent
Bray et al.

(10) Patent No.: US 8,849,857 B2
(45) Date of Patent: Sep. 30, 2014

(54) TECHNIQUES FOR PERFORMING DATA LOSS PREVENTION

(75) Inventors: Gavin G. Bray, Robina (AU); Lachlan A. Hillman, Jacobs Well (AU)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 12/971,082

(22) Filed: Dec. 17, 2010

(65) Prior Publication Data

US 2012/0159565 A1 Jun. 21, 2012

(51) Int. Cl.
- *G06F 7/00* (2006.01)
- *G06F 7/04* (2006.01)
- *G06Q 10/10* (2012.01)
- *G06F 21/60* (2013.01)

(52) U.S. Cl.
CPC .............. *G06F 21/604* (2013.01); *G06Q 10/10* (2013.01)
USPC ............................................. 707/783; 726/26

(58) Field of Classification Search
USPC ............ 726/25, 1, 26–33; 713/152, 164–167; 707/705, 821, 999.1; 709/202, 223
See application file for complete search history.

(56) References Cited

U.S. PATENT DOCUMENTS

| | | | | |
|---|---|---|---|---|
| 7,310,822 B2 * | 12/2007 | LaMacchia et al. | ............. | 726/27 |
| 7,398,556 B2 * | 7/2008 | Erickson | ........................ | 726/27 |
| 7,478,419 B2 * | 1/2009 | Anderson et al. | ................. | 726/1 |
| 7,757,271 B2 | 7/2010 | Amdur et al. | | |
| 8,060,596 B1 * | 11/2011 | Wootton et al. | ............... | 709/223 |
| 8,141,127 B1 * | 3/2012 | Mustafa | ............................ | 726/1 |
| 8,166,516 B2 * | 4/2012 | McCollum et al. | ............... | 726/1 |
| 8,225,371 B2 * | 7/2012 | Jones et al. | ........................ | 726/1 |
| 2007/0143839 A1 * | 6/2007 | Chen et al. | ....................... | 726/17 |
| 2007/0226808 A1 | 9/2007 | Uchikawa | | |
| 2008/0066150 A1 | 3/2008 | Lim | | |
| 2009/0077133 A1 * | 3/2009 | Hsu et al. | ....................... | 707/200 |
| 2010/0036779 A1 | 2/2010 | Sadeh-Koniecpol et al. | | |
| 2010/0095348 A1 * | 4/2010 | Foster et al. | ....................... | 726/1 |
| 2010/0132012 A1 | 5/2010 | Van Riel et al. | | |
| 2010/0146269 A1 | 6/2010 | Baskaran | | |
| 2010/0162347 A1 * | 6/2010 | Barile | ............................... | 726/1 |
| 2010/0306850 A1 * | 12/2010 | Barile et al. | ..................... | 726/25 |
| 2011/0083190 A1 * | 4/2011 | Brown et al. | .................... | 726/26 |

(Continued)

OTHER PUBLICATIONS

Shand, Brian—'Trust for resource control: Self-enforcing automatic rational contracts between computers'; Technical Report No. 600 (Abstract)—Aug. 2004 (154 pp); University of Cambridge, UK.

(Continued)

*Primary Examiner* — Michael R Vaughan
*Assistant Examiner* — Abdullah Almamun
(74) *Attorney, Agent, or Firm* — Yudell Isidore Ng Russell PLLC; Jeff Labaw (57) ABSTRACT

A technique for performing data loss prevention includes creating for a user, using a data processing system, respective permissive policies with a most permissive enforcement action for each content category of a resource. In this case, the content category includes at least two categories. The technique also includes forming, using the data processing system, a policy set based on the respective permissive policies. The technique further includes creating, using the data processing system, an effective policy from the policy set using a least permissive enforcement action. Finally, the technique includes applying, using the data processing system, the effective policy to determine whether a user action is permitted on the resource.

20 Claims, 4 Drawing Sheets

(56) References Cited

U.S. PATENT DOCUMENTS

2011/0113467 A1* 5/2011 Agarwal et al. ............ 726/1
2011/0289134 A1* 11/2011 de los Reyes et al. ...... 709/203
2012/0151551 A1* 6/2012 Readshaw et al. .......... 726/1

OTHER PUBLICATIONS

Basin et al—'Automatic Generation of Smart, Security-Aware GUI Models'—Paper (no date); ETH Zurich, Switzerland; Imdea Software Institute, Madrid Spain; Universidad Complutense de Madrid, Spain (http://www.infsec.ethz.ch/people/michschl/material/essos10.pdf).

Yu et al—'Achieving Secure, Scalable, and Fine-grained Data Access Control in Cloud Computing'—Paper presented at IEEE INFOCOM 2010 (978-1-4244-5837-0/10.

Security policy and employee access (http://searchsecurity.techtarget.com/tip/0,289483,sid14_gci932704,00.html).

* cited by examiner

TECHNIQUES FOR PERFORMING DATA LOSS PREVENTION

BACKGROUND

1. Technical Field

The present invention generally relates to data loss prevention and in particular to techniques for performing data loss prevention.

2. Description of the Related Art

Data loss prevention (DLP) is a computer security term that refers to systems that implement a centralized management framework to identify, monitor, and protect data in use, data in motion, and data at rest through deep content inspection and contextual security analysis of transactions. In general, DLP systems are designed to detect and prevent the unauthorized use and transmission of confidential information. Many companies now fall under oversight of regulations that mandate controls over information. At least some regulations require organizations to perform periodic information technology (IT) audits, which an organization can fail if the organization fails to implement suitable IT security controls and standards. Loss of large volumes of information has become a regular headline event, forcing financial companies to re-issue credit and debit cards, notify customers, and mitigate loss of goodwill from negative publicity.

Network DLP systems, also referred to as gateway-based DLP systems, are usually dedicated hardware/software platforms that are installed on an Internet network connection of an organization. Network DLP systems analyze network traffic to search for unauthorized information transmissions, including content of email, instant messaging (IM), file transfer protocol (FTP), hypertext transfer protocol (HTTP), and HTTP secure (HTTPS) transmissions. Advantageously, network DLP systems are relatively simple to install and provide a relatively low cost of ownership. Network DLP systems can also discover data at rest (data stored throughout an organization) to identify areas of risk where confidential data is stored in inappropriate and/or unsecure locations.

Host-based DLP systems usually run on end-user workstations or servers in an organization. Like network DLP systems, host-based DLP systems can address internal and external communications and can be used to control information flow between groups or types of users (e.g., through the implementation of Chinese walls). Host-based DLP systems can also control email and IM communications, such that blocked communications that are not subject to retention rules are not stored in a corporate archive. Advantageously, host-based DLP systems can monitor and control access to physical devices (such as mobile devices with data storage capabilities) and in some cases can access information before the information is encrypted. Some host-based DLP systems can also provide application controls to block attempted transmissions of confidential information and provide immediate feedback to a user. In general, host-based DLP systems need to be installed on each computer system in a network and cannot usually be used on mobile devices (e.g., cell phones and personal digital assistants (PDAs)). Moreover, host-based DLP systems cannot be practically installed in some applications (e.g., on computer systems in an Internet cafe).

BRIEF SUMMARY

Disclosed are a method, a data processing system, and a computer program product for performing data loss prevention.

A technique for performing data loss prevention includes creating for a user, using a data processing system, respective permissive policies with a most permissive enforcement action for each content category of a resource. In this case, the content category includes at least two categories. The technique also includes forming, using the data processing system, a policy set based on the respective permissive policies. The technique further includes creating, using the data processing system, an effective policy from the policy set using a least permissive enforcement action. Finally, the technique includes applying, using the data processing system, the effective policy to determine whether a user action is permitted on the resource.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a computer program product for implementing data loss prevention (DLP).

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

In general, DLP solutions include a number of techniques for identifying confidential or sensitive information. Data identification is a process by which organizations use a DLP technology to determine what to look for (e.g., in motion, at rest, or in use information). DLP solutions may use multiple approaches for deep content analysis (e.g., ranging from keywords, dictionaries, and regular expressions to partial document matching and fingerprinting). The strength of an analysis engine employed to perform DLP directly correlates to the accuracy of the DLP and accurate DLP identification is desirable to lower/avoid false positives and negatives.

To address the data loss problem, organizations generally focus on content filtering and blocking of electronic communications (e.g., email, instant messaging (IM), webmail, HTTP and FTP communications) leaving an organizational network. In general, electronic communications should be policed to prevent a variety of sensitive information (e.g., intellectual property, financial information, patient information, and personal credit/debit card data) from falling into the wrong hands. While a great deal of attention has been focused on protecting electronic assets of a company from outside threats (e.g., using intrusion prevention systems such as firewalls), organizations are also susceptible to data loss from the inside. In fact, in many organizations a hole exists in the controlled secure environment created to protect electronic assets. For example, electronic communications (e.g., email, IM, webmail, a form on a website, and file transfer) exiting an organization are still usually largely uncontrolled and unmonitored.

Data loss prevention addresses loss of various information, e.g., confidential customer information and source code files for a company product. Whether deliberate or accidental, data loss occurs any time an individual (e.g., an employee, a consultant, or other insider) releases sensitive customer data, financial data, intellectual property, and/or other confidential information in violation of organizational policies and regulatory requirements. In the event sensitive information is lost, the lost sensitive information can wreak havoc on a bottom line of an organization (e.g., through fines, bad publicity, loss of strategic customers, loss of competitive intelligence, and legal action).

Figure 1:
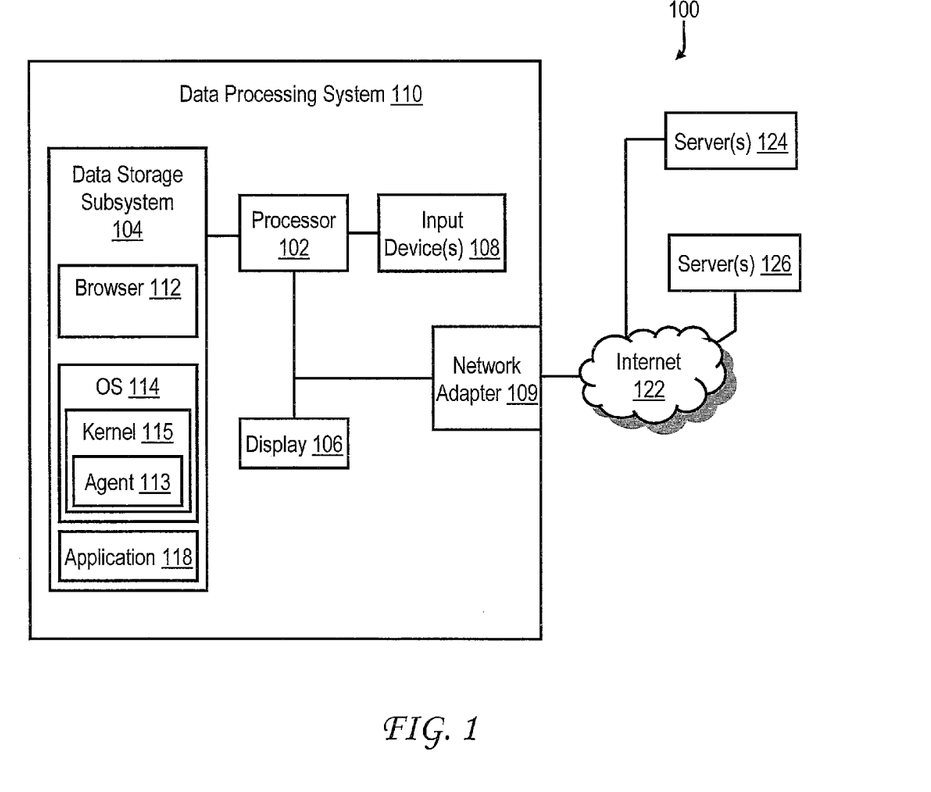
FIG. 1 is a diagram of a relevant portion of an exemplary data processing environment with a data processing system that implements data loss prevention (DLP) in accordance with various embodiments of the present disclosure.

With reference to FIG. 1, an exemplary data processing environment 100 is illustrated that includes a data processing system 110 that is configured to implement data loss prevention (DLP) according to one or more embodiments of the present disclosure. Data processing system 110 may take various forms, such as workstations, laptop computer systems, notebook computer systems, or desktop computer systems and/or clusters thereof. Data processing system 110 includes a processor 102 (which may include one or more processor cores for executing program code) coupled to a data storage subsystem 104, a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes an operating system (OS) 114 for data processing system 110 that includes an OS kernel 115 that may implement an enforcement agent 113 to perform DLP according to the present disclosure. Alternatively, DLP according to the present disclosure may be performed in an OS-aware application that includes an enforcement agent. Data storage subsystem 104 also includes application programs, such as a browser 112 (which may optionally include customized plug-ins to support various client applications), and other applications (e.g., a word processing application, a presentation application, and an email application) 118.

As is well known, a browser (or web browser) is a software application that allows a user (at a client) to display and interact with text, images, and other information located on a web page at a website (hosted by an application server) on the World Wide Web or a local area network. Text and images on a web page may contain hyperlinks to other web pages at the same or different website. Browsers allow a user to quickly and easily access information provided on web pages at various websites by traversing hyperlinks. A number of different browsers, e.g., Internet Explorer, Mozilla Firefox, Safari, Opera, and Netscape, are currently available for personal computers. In general, browsers are the most commonly used type of hypertext transfer protocol (HTTP) user agent. While browsers are typically used to access web application servers (hereinafter "web servers") that are part of the World Wide Web, browsers can also be used to access information provided by web servers in private networks or content in file systems.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

DLP systems typically utilize policies that govern actions performed by various subsystems. Actions performed by DLP systems may include: identifying sensitive information, e.g. intellectual property and personally identifiable information; monitoring use of sensitive information; and controlling user operations on sensitive information. In any DLP system, there are often numerous policies governing what actions users can perform on resources containing sensitive information. These policies often overlap and may provide conflicting information with regards to what action can be performed and by whom in a given situation. When policies conflict, a policy precedence problem exists when no explicit rules for handling the conflict exist. In general, to adequately address a policy precedence problem, a DLP system is required to combine all applicable policies into an effective policy.

The complexity of the policy precedence problem is compounded when a resource (e.g., a file, email text, etc.) matches multiple different definitions for sensitive content (or content categories), each of which provides a different conflicting policy. According to the present disclosure, the policy precedence problem is addressed through a technique that creates an effective policy by combining a superset of policies from all matching content categories that apply to a resource. According to various aspects of the present disclosure, techniques for determining an effective policy for a resource are based on policies provided by matching content categories. In one or more embodiments, the least and most permissive enforcement actions of each policy are used to make an effective policy determination. In general, the disclosed techniques do not require specification of an explicit policy precedence and, as such, a resulting effective policy is easier to manage and exhibits a well understood behavior. It should be appreciated that multiple overlapping policies may be readily managed according to the present disclosure.

As used herein, a 'resource' is an entity that includes information (e.g., a file on disk and email text). As is also used herein a 'user action' is an action that a user is attempting to perform on a resource (e.g., print). As used herein, an 'enforcement action' is an action (e.g., permit or deny) taken by an enforcement agent based on the user, the user action, and a target resource as defined by a policy. Permissiveness of an enforcement action is determined by a list of enforcement actions ordered by permissiveness (e.g., permit, permit with warning, deny). A content category is a category or classification of a resource (e.g., source code, personally identifiable information, etc.). As used herein, an 'effective policy' is the policy that results from the policy combination technique disclosed herein. For a file, an effective policy (single enforcement policy) is determined from content categories that apply to the file and policies that apply to a user and the file within each content category.

A single enforcement policy may be implemented by the pseudo code set forth below:

```
Permissive Policy Set = { }
For each content category that applies to a resource
Combined policy = Combine policies within content category to form
    new policy with most permissive enforcement actions
Add (Permissive Policy Set, Combined policy)
Effective Policy = Combine policies in Permissive Policy Set to form
    new policy with least permissive enforcement actions
Return Effective Policy
```

In the pseudo code above, for each content category that applies to a resource, a combined policy is created with the most permissive enforcement actions that applies to the content category. From a resulting policy list, a policy is created with the least permissive enforcement actions from each policy to provide an effective policy.

Figure 2:
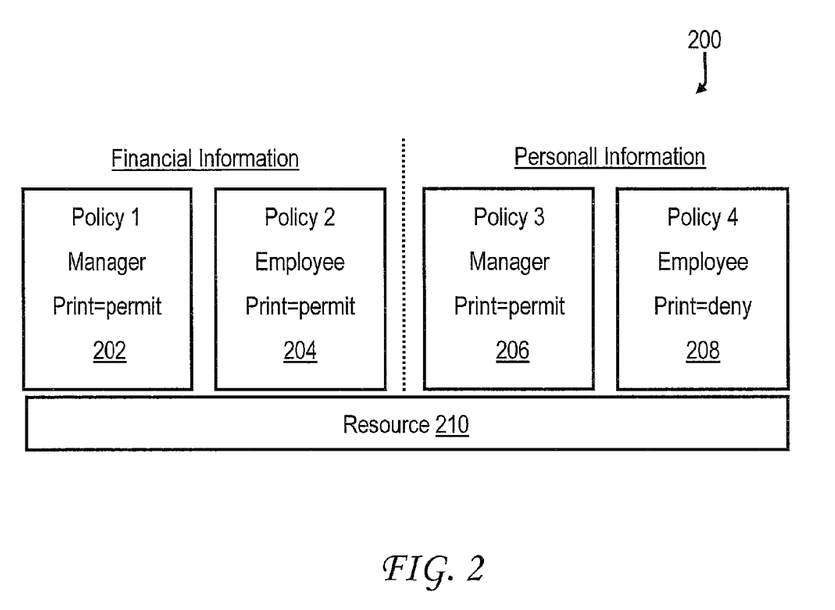
FIG. 2 is an illustrative diagram for implementing DLP in accordance with an embodiment of the present disclosure.

With reference to FIG. 2, a diagram 200 depicts an example in which a resource (e.g., data such as a file stored on a hard disk drive (HDD) or a text document included in volatile memory) 210 has two content categories (i.e., a 'financial information' content category and 'personal information' content category) that are applicable. In this example, an associated enforcement action order from most permissive to least permissive includes two orders: 'permit' and 'deny'. Each of the content categories contain two policies (one policy for a manager and another policy for an employee), each of which describes an allowable user action for a different group. In the example illustrated in FIG. 2, there are two users, Alice (a member of the employee group) and Bob (a member of both the employee and manager groups). In this example, Alice and Bob both attempt to perform the 'print' user action on resource 210. In order to determine an effective policy for Alice and an effective policy for Bob, a policy precedence technique according to the present disclosure is applied.

With respect to Alice, for each content category, a policy is created with the most permissive enforcement actions from each applicable policy. A 'financial information' permissive policy 204 (that is applicable to Alice) allows Alice to print financial information (i.e., print=permit for an employee) while a 'personal information' permissive policy 208 (that is applicable to Alice) does not allow Alice to print personal information (i.e., print=deny for an employee). From the resulting list of policies (print=permit, print=deny), an effective policy is created with the least permissive enforcement action (i.e., print=deny), which prevents Alice from printing resource 210.

With respect to Bob, a policy is also created for each content category with the most permissive enforcement actions from each applicable policy. Financial information permissive policies 202 and 204 (that are applicable to Bob as a manager and an employee) allow Bob to print financial information (i.e., print=permit for a manager, print=permit for an employee). Personal information permissive policies 206 and 208 that are applicable to Bob (as a manager and an employee) allows Bob to print personal information (print=permit for a manager, print=deny for an employee). From the resulting list of policies (print=permit for a manager, print=permit for a manager), an effective policy is created with the least permissive enforcement actions, which allows Bob to print resource 210 (i.e., print=permit).

Figure 3:
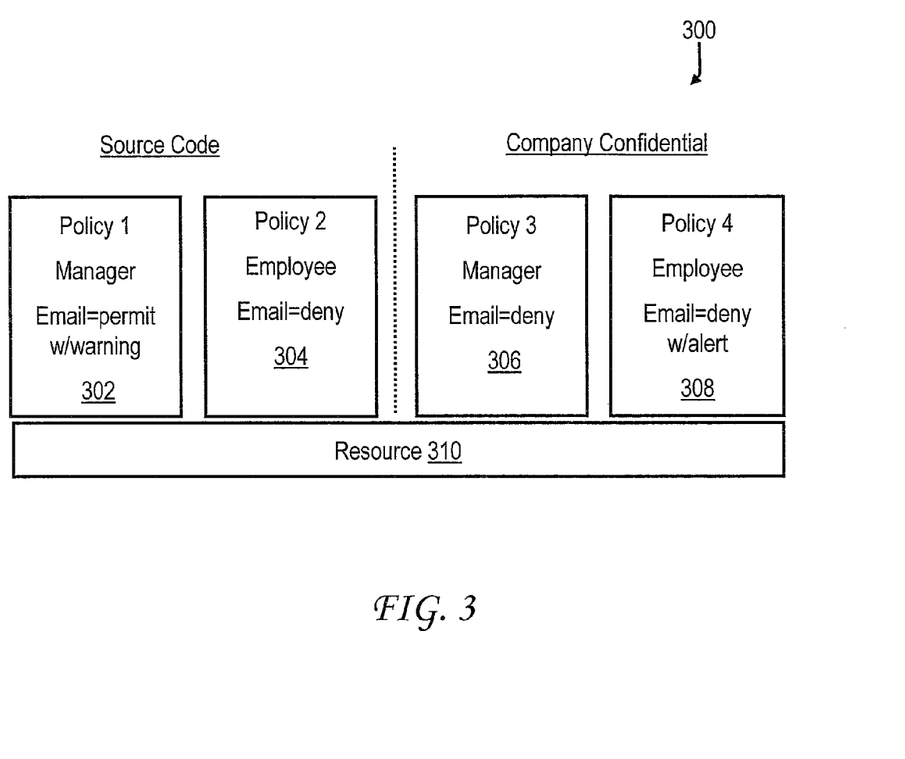
FIG. 3 is another illustrative diagram for implementing DLP in accordance with an embodiment of the present disclosure.

With reference to FIG. 3, a diagram 300 depicts another example in which a resource (e.g., data included in an email) 310 has two content categories (i.e., a 'source code' content category and 'company confidential' content category) that are applicable. An associated enforcement action order from most permissive to least permissive includes four orders: 'permit', 'permit with warning', 'deny', and 'deny with alert'. Both of the content categories contain two policies (one policy for a manager and another policy for an employee), each of which describes an allowable user action for a different group. In this example, there are two users, Alice (a member of the employee group) and Bob (a member of both the employee and manager groups). For this example, both Alice and Bob attempt to perform an 'email' user action on resource 310. In order to determine an effective policy for Alice and an effective policy for Bob, a policy precedence technique is applied according to the present disclosure. For each content category, a policy is initially created with the most permissive enforcement actions from each applicable policy.

For Alice, a source code permissive policy 304 does not allow Alice to email source code (i.e., email=deny for an employ attempting to email source code). A company confidential permissive policy 308 does not allow Alice to email company confidential information and provides an alert to a system administrator (i.e.: email=deny with alert for an employee attempting to email company confidential information). From the resulting list of policies (email=deny, email=deny with alert), an effective policy is created with the least permissive enforcement actions. In this case, the effective policy dictates that the email is denied with an alert being provided to a system administrator. The effective policy is selected because an enforcement action order of 'deny with alert' is less permissive than an enforcement action order of 'deny'. In sum, the effective policy denies Alice from emailing resource 310 and sends an alert to a system administrator that Alice has attempted to email resource 310.

With respect to Bob, for each content category a policy is created with the most permissive enforcement actions from each applicable policy. For the source code content category, respective permissive policies 302 and 304 (email=permit with warning, email=deny) allow Bob to email source code with a warning. For the company confidential content category, permissive policies 306 and 308 (email=deny, email=deny with alert) prevent Bob from emailing company confidential information. From the resulting list of policies (email=permit with warning, email=deny), an effective policy is created with the least permissive enforcement action, which in this case prevent Bob from emailing resource 310 (i.e., email=deny). This policy is chosen because 'deny' is less permissive than 'permit with warning' according to the enforcement action ordering.

It should be appreciated that other enforcement actions, e.g., a prompt (to ask the user if they wish to continue the action) or locking the user out of the system, may be taken in accordance with the techniques disclosed herein. It should also be appreciated that the disclosed techniques are applicable to an arbitrary number of policies and/or content categories. Irrespective of the number of policies in a content category, the most permissive enforcement action for a given user to which the policy applies is selected. A least permissive policy from the set of most permissive policies for each content category is then selected as the effective policy.

Figure 4:
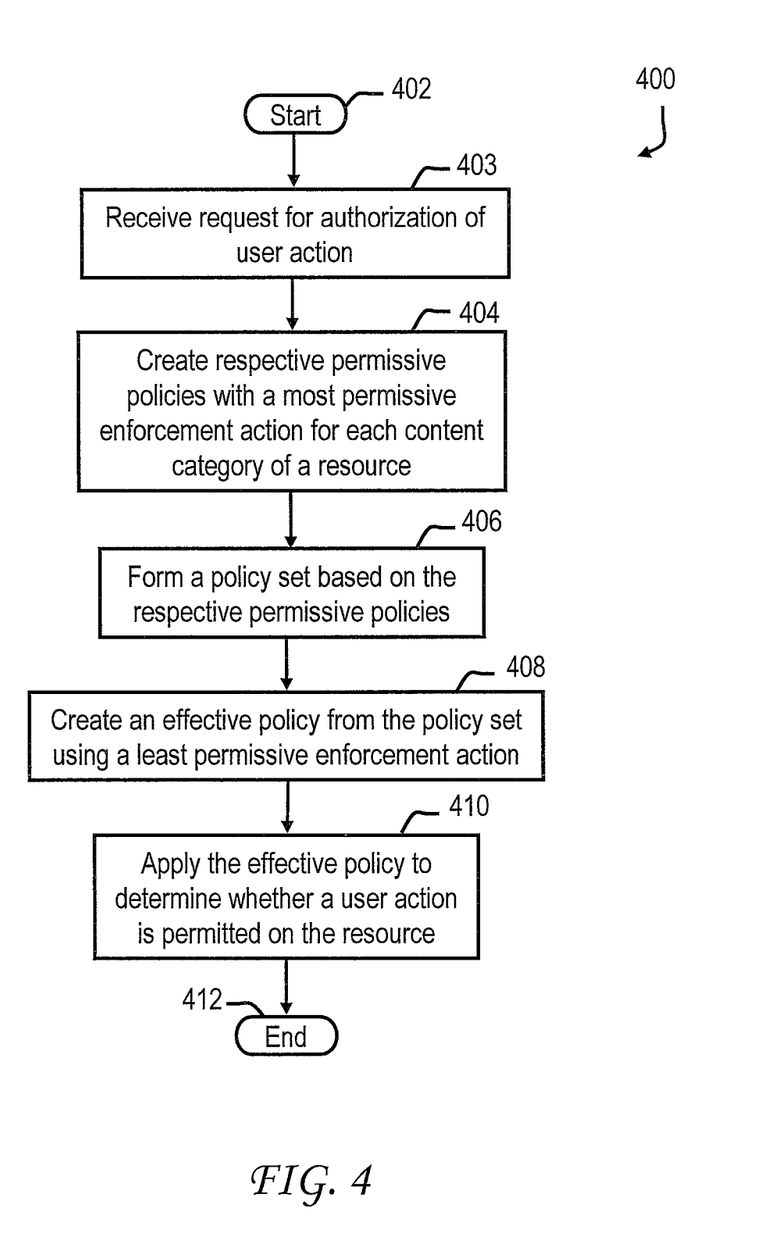
FIG. 4 is a flow chart of an exemplary process for implementing DLP according to various embodiments of the present disclosure.

With reference to FIG. 4, a flow chart for an exemplary process 400 that implements data loss prevention, according to various embodiments of the present disclosure, is illustrated. The depicted process may be performed, for example, by agent 113 of FIG. 1, with data processing system 110 serving as a host-based or network-based DLP system. For ease of understanding, process 400 is explained in conjunction with FIG. 2.

Process 400 is initiated at block 402 in response to, for example, an initiated user action. The initiated user action may, for example, correspond to Alice (an employee) attempting to print resource 210. Next, in block 403 an enforcement agent (implemented within OS kernel 115 or an OS aware application) receives a request for authorization of a user action. It should be appreciated that a user action may correspond to user actions other than printing a file (e.g., a user action may correspond to a user attempting to: send an email to another internal or external intranet user; write a file to an external storage device (e.g., a universal serial bus (USB) stick or an external hard disk drive (HDD)); upload a file via a file transfer protocol; send a message via a chat application; read a document from network storage; or any action that involves classified data). Then, in block 404, the enforcement agent creates respective permissive policies (based on policies set by, for example, a system administrator) with a most permissive enforcement action for each content category for a resource. In this case, at least two content categories apply to the resource. For example, with reference to FIG. 2, a financial information content category and a personal information content category apply to resource 210.

Next, in block 406, the enforcement agent forms a policy set based on the respective permissive policies created in block 404. For example, with reference to FIG. 2, Alice is allowed to print financial information, but is not allowed to print personal information. In this case, a policy set (print=permit, print=deny) is applicable to resource 210 for Alice. Then, in block 408, the enforcement agent creates an effective policy set using a least permissive enforcement action (based on enforcement actions set by, for example, a system administrator) from the policy set (print=permit, print=deny) formed in block 406. Next, in block 410, the enforcement agent applies the effective policy to determine whether a user action is permitted on the resource. With respect to FIG. 2, the effective policy does not allow Alice to print resource 210 (i.e., print=deny is the least permissive enforcement action from the policy set). Following block 410, process 400 ends at block 412.

In the flow chart above, the method depicted in FIG. 4 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for performing data loss prevention, comprising:
creating for a user, using a data processing system, respective permissive policies with a most permissive enforcement action for each content category of a resource, wherein the content category includes at least two categories;

forming, using the data processing system, a policy set based on the respective permissive policies;

creating, using the data processing system, an effective policy from the policy set using a least permissive enforcement action; and applying, using the data processing system, the effective policy to determine whether a user action is permitted on the resource.

2. The method of claim 1, wherein the resource is an electronic file and the user action corresponds to printing the electronic file.

3. The method of claim 1, wherein the resource is an electronic file and the user action corresponds to emailing the electronic file to another user included within an intranet that also includes the data processing system.

4. The method of claim 1, wherein the resource is an electronic file and the user action corresponds to emailing the electronic file to another user that is not included within an intranet that also includes the data processing system.

5. The method of claim 1, wherein the user belongs to a single group.

6. The method of claim 1, wherein the user belongs to multiple groups.

7. The method of claim 1, wherein the resource is an electronic file and the user action corresponds to copying the electronic file to a portable storage media.

8. A computer program product for performing data loss prevention on a data processing system, the computer program product comprising:

a tangible computer-readable storage medium having computer-readable program code embodied thereon, wherein the computer-readable program code, when executed by a data processing system, causes the data processing system to create for a user respective permissive policies with a most permissive enforcement action for each content category of a resource, wherein the content category includes at least two categories;

form a policy set based on the respective permissive policies;

create an effective policy from the policy set using a least permissive enforcement action; and apply the effective policy to determine whether a user action is permitted on the resource.

9. The computer program product of claim 8, wherein the resource is an electronic file and the user action corresponds to printing the electronic file.

10. The computer program product of claim 8, wherein the resource is an electronic file and the user action corresponds to emailing the electronic file to another user included within an intranet that also includes the data processing system.

11. The computer program product of claim 8, wherein the resource is an electronic file and the user action corresponds to emailing the electronic file to another user that is not included within an intranet that also includes the data processing system.

12. The computer program product of claim 8, wherein the user belongs to a single group.

13. The computer program product of claim 8, wherein the user belongs to multiple groups.

14. The computer program product of claim 8, wherein the resource is an electronic file and the user action corresponds to copying the electronic file to a portable storage media.

15. A data processing system, comprising:

a memory; and a processor core coupled to the memory, wherein the processor core is configured to:

create for a user respective permissive policies with a most permissive enforcement action for each content category of a resource, wherein the content category includes at least two categories;

form a policy set based on the respective permissive policies;

create an effective policy from the policy set using a least permissive enforcement action; and apply the effective policy to determine whether a user action is permitted on the resource.

16. The data processing system of claim 15, wherein the resource is an electronic file and the user action corresponds to printing the electronic file.

17. The data processing system of claim 15, wherein the resource is an electronic file and the user action corresponds to emailing the electronic file to another user.

18. The data processing system of claim 15, wherein the user belongs to a single group.

19. The data processing system of claim 15, wherein the user belongs to multiple groups.

20. The data processing system of claim 15, wherein the resource is an electronic file and the user action corresponds to copying the electronic file to a portable storage media.

* * * * *